United States Patent
Fischer et al.

(10) Patent No.: US 9,283,920 B1
(45) Date of Patent: Mar. 15, 2016

(54) AIR BAG WITH UNINFLATED POCKET

(71) Applicant: TRW Vehicle Safety Systems Inc., Washington, MI (US)

(72) Inventors: Kurt F. Fischer, Leonard, MI (US); Roy Turnbull, Shelby Township, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 14/535,382

(22) Filed: Nov. 7, 2014

(51) Int. Cl.
  *B60R 21/235* (2006.01)
  *B60R 21/2338* (2011.01)

(52) U.S. Cl.
  CPC ............ *B60R 21/2338* (2013.01); *B60R 21/235* (2013.01); *B60R 2021/23382* (2013.01)

(58) Field of Classification Search
  CPC .............. B60R 21/2338; B60R 21/235; B60R 21/23382
  See application file for complete search history.

(56) References Cited

U.S. PATENT DOCUMENTS

| | | | |
|---|---|---|---|
| 3,731,949 A | 5/1973 | Radke et al. |
| 4,300,894 A | 11/1981 | Cumming et al. |
| 5,018,762 A | 5/1991 | Suzuki et al. |
| 5,306,043 A | 4/1994 | Mihm et al. |
| 5,308,113 A | 5/1994 | Moriset |
| 5,362,101 A | 11/1994 | Sugiura et al. |
| 5,505,485 A | 4/1996 | Breed |
| 5,520,413 A | 5/1996 | Mossi et al. |
| 5,945,184 A | 8/1999 | Nagata et al. |
| 6,302,433 B1 | 10/2001 | Ellerbrok et al. |
| 6,536,800 B2 | 3/2003 | Kumagai et al. |
| 6,616,184 B2 | 9/2003 | Fischer |
| 6,655,714 B2 | 12/2003 | Fellhauer et al. |
| 6,786,505 B2 | 9/2004 | Yoshida |
| 6,802,534 B2 | 10/2004 | Neupert |
| 6,832,780 B2 | 12/2004 | Amamori |
| 7,000,947 B2 | 2/2006 | Kumagai |
| 7,073,818 B2 | 7/2006 | Hasebe |
| 7,128,337 B2 | 10/2006 | Kwon |
| 7,360,789 B2 | 4/2008 | Bito |
| 7,556,290 B2 | 7/2009 | Williams et al. |
| 7,568,729 B2 | 8/2009 | Schnieder et al. |
| 7,597,355 B2 | 10/2009 | Williams et al. |

(Continued)

FOREIGN PATENT DOCUMENTS

| | | |
|---|---|---|
| CN | 100471731 | 3/2009 |
| CN | 102390345 | 3/2012 |

(Continued)

*Primary Examiner* — Drew Brown
(74) *Attorney, Agent, or Firm* — Tarolli, Sundheim, Covell & Tummino LLP

(57) ABSTRACT

An inflatable vehicle occupant protection device (14) is provided for being inflated with inflation fluid towards a seat (22) of the vehicle (12). The protection device includes a front portion (70) presented towards the vehicle seat (22) and helping to define an inflatable volume (54). The front portion (70) includes a pair of extensions (344, 444) overlaid on one another and interconnected to form a pocket (100) defining a collapsed volume (120) outside the inflatable volume (54). The pocket (100) extends horizontally across the front portion (70) and towards the inflatable volume (54). A tether (500) has a first end portion (502) secured to both interconnected extensions (344, 444) and a second end portion (504) secured to a portion of the protection device such that the size of the pocket (100) remains larger than a predetermined amount when the protection device is fully inflated.

34 Claims, 6 Drawing Sheets

(56) References Cited

U.S. PATENT DOCUMENTS

| | | | |
|---|---|---|---|
| 7,597,356 B2 | 10/2009 | Williams | |
| 7,614,653 B2 | 11/2009 | Rose et al. | |
| 7,614,654 B2 | 11/2009 | Williams | |
| 7,654,568 B2 | 2/2010 | Yamada | |
| 7,722,080 B2 | 5/2010 | Rose et al. | |
| 7,748,738 B2 | 7/2010 | Schneider | |
| 7,770,926 B2 | 8/2010 | Schneider et al. | |
| 7,793,977 B2 | 9/2010 | Sato et al. | |
| 7,938,438 B2 | 5/2011 | Denys et al. | |
| 7,938,445 B2 | 5/2011 | Smith et al. | |
| 7,946,613 B2 | 5/2011 | Rose et al. | |
| 7,967,331 B2 | 6/2011 | Lim | |
| 7,984,924 B2 | 7/2011 | Yamada | |
| 8,181,990 B2 | 5/2012 | Maripudi | |
| 8,191,925 B2 | 6/2012 | Williams | |
| 8,215,671 B2 | 7/2012 | Bergstrom | |
| 8,282,122 B2 * | 10/2012 | Marable et al. | 280/729 |
| 8,282,129 B2 | 10/2012 | Choi | |
| 8,342,573 B2 | 1/2013 | Kwon | |
| 8,371,612 B2 | 2/2013 | Williams | |
| 8,646,808 B2 | 2/2014 | Williams | |
| 8,651,521 B2 | 2/2014 | Kuhne | |
| 8,684,404 B2 | 4/2014 | Fischer et al. | |
| 8,696,022 B2 | 4/2014 | Fischer et al. | |
| 8,807,596 B1 | 8/2014 | Co et al. | |
| 8,882,143 B2 | 11/2014 | Williams et al. | |
| 2001/0033072 A1 | 10/2001 | Kumagai et al. | |
| 2001/0052691 A1 | 12/2001 | Bieber et al. | |
| 2002/0171232 A1 | 11/2002 | Abe | |
| 2003/0030254 A1 | 2/2003 | Hasebe | |
| 2003/0116951 A1 | 6/2003 | Igawa | |
| 2007/0262572 A1 * | 11/2007 | Fischer et al. | 280/730.1 |
| 2010/0032931 A1 * | 2/2010 | Kumagai et al. | 280/742 |
| 2010/0102542 A1 * | 4/2010 | Nakajima et al. | 280/743.2 |
| 2010/0225094 A1 * | 9/2010 | Rose et al. | 280/729 |
| 2010/0225095 A1 * | 9/2010 | Smith et al. | 280/729 |
| 2011/0025024 A1 | 2/2011 | Choi | |
| 2011/0062693 A1 | 3/2011 | Williams | |
| 2011/0260431 A1 | 10/2011 | Kwon | |
| 2014/0015230 A1 | 1/2014 | Le Norcy et al. | |

FOREIGN PATENT DOCUMENTS

| | | |
|---|---|---|
| DE | 19643052 | 9/1997 |
| DE | 19850827 | 7/2000 |
| EP | 714815 | 6/1996 |
| EP | 1140568 | 10/2001 |
| EP | 1439096 | 7/2004 |
| EP | 1516785 | 3/2005 |
| EP | 1405770 | 3/2006 |
| EP | 18322406 | 3/2006 |
| EP | 1951560 | 7/2009 |
| EP | 2272726 | 1/2011 |
| JP | 2002255004 | 9/2002 |
| WO | 2008099130 | 8/2008 |
| WO | 2012122998 | 9/2012 |

* cited by examiner

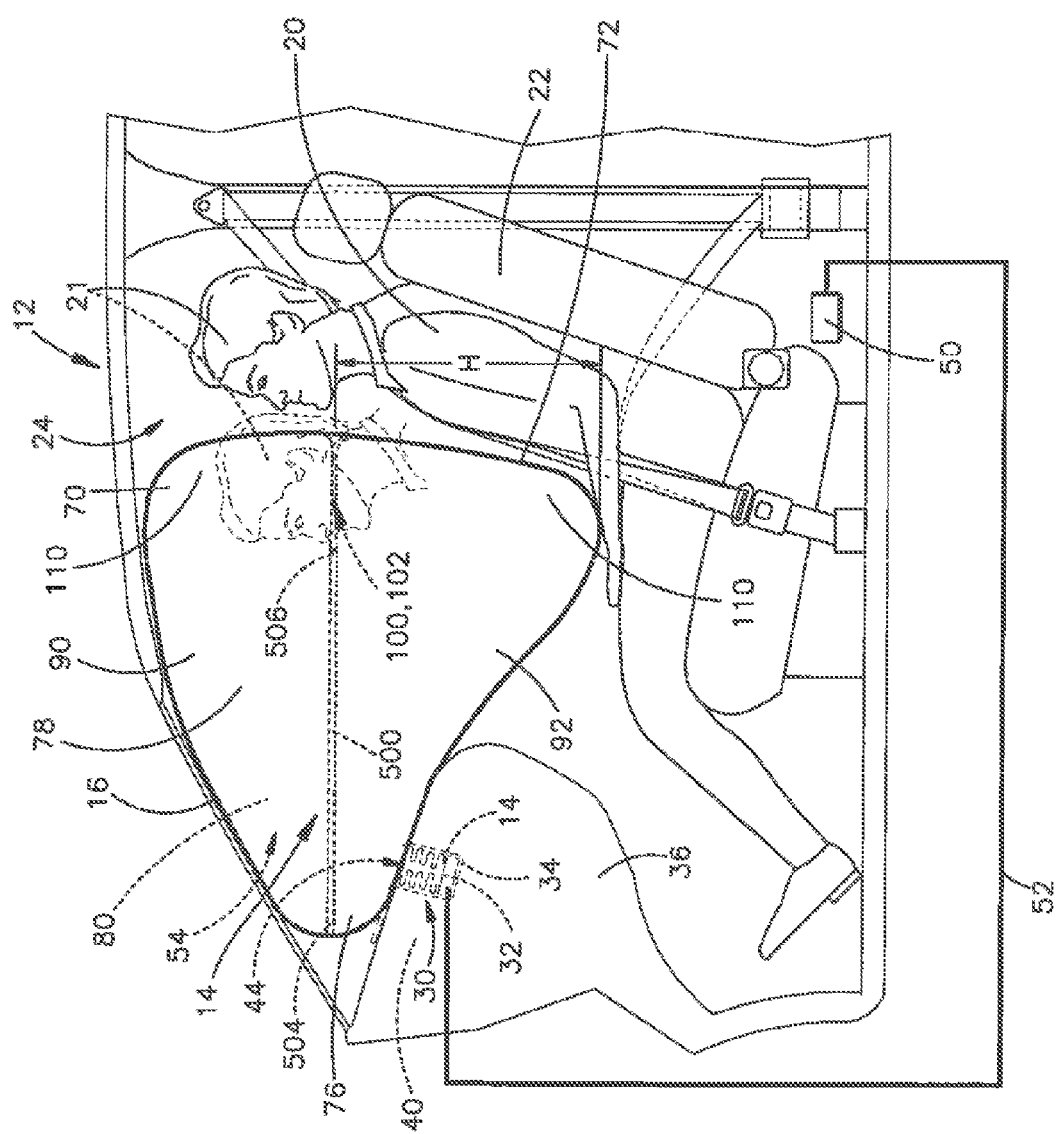

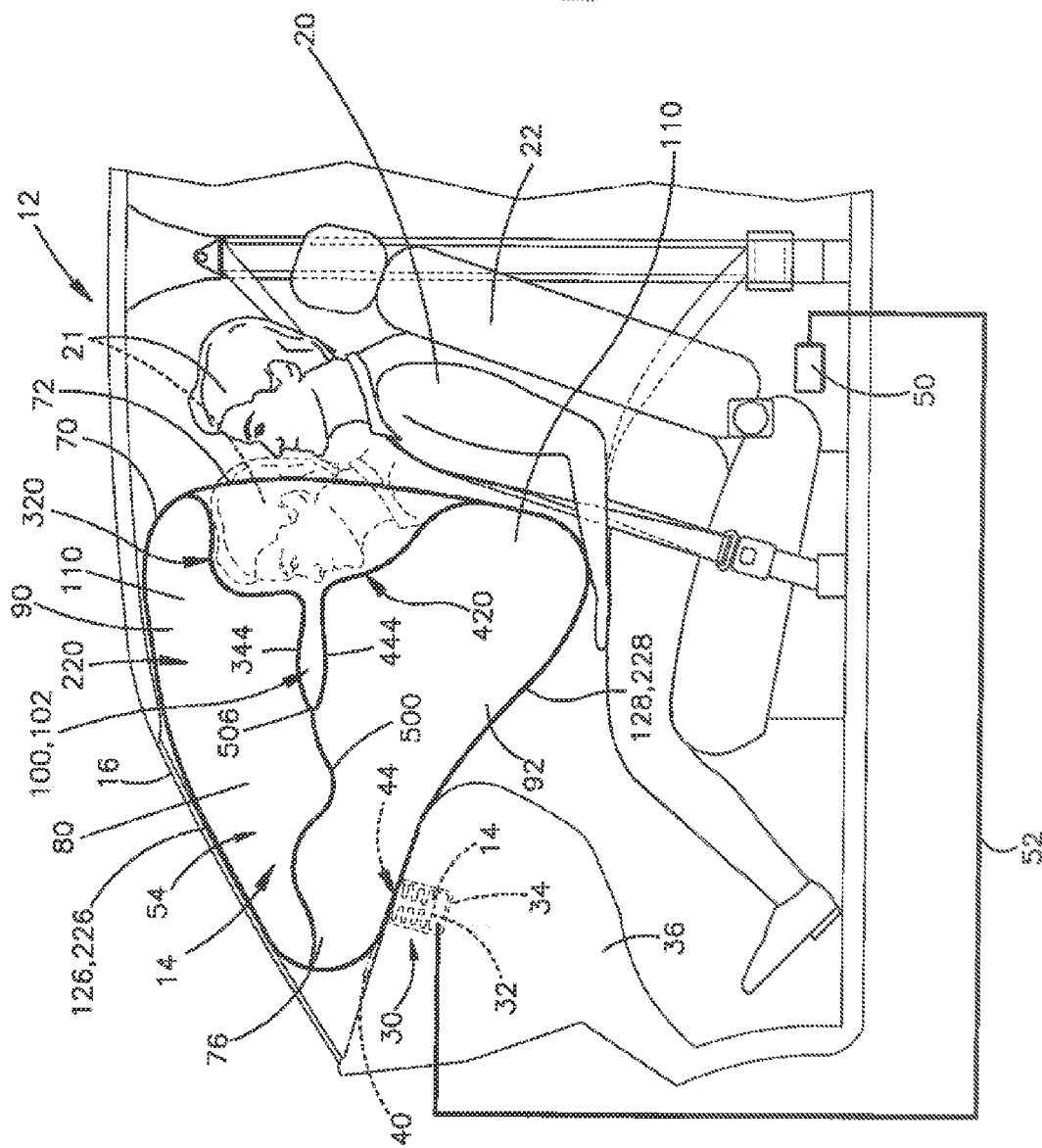

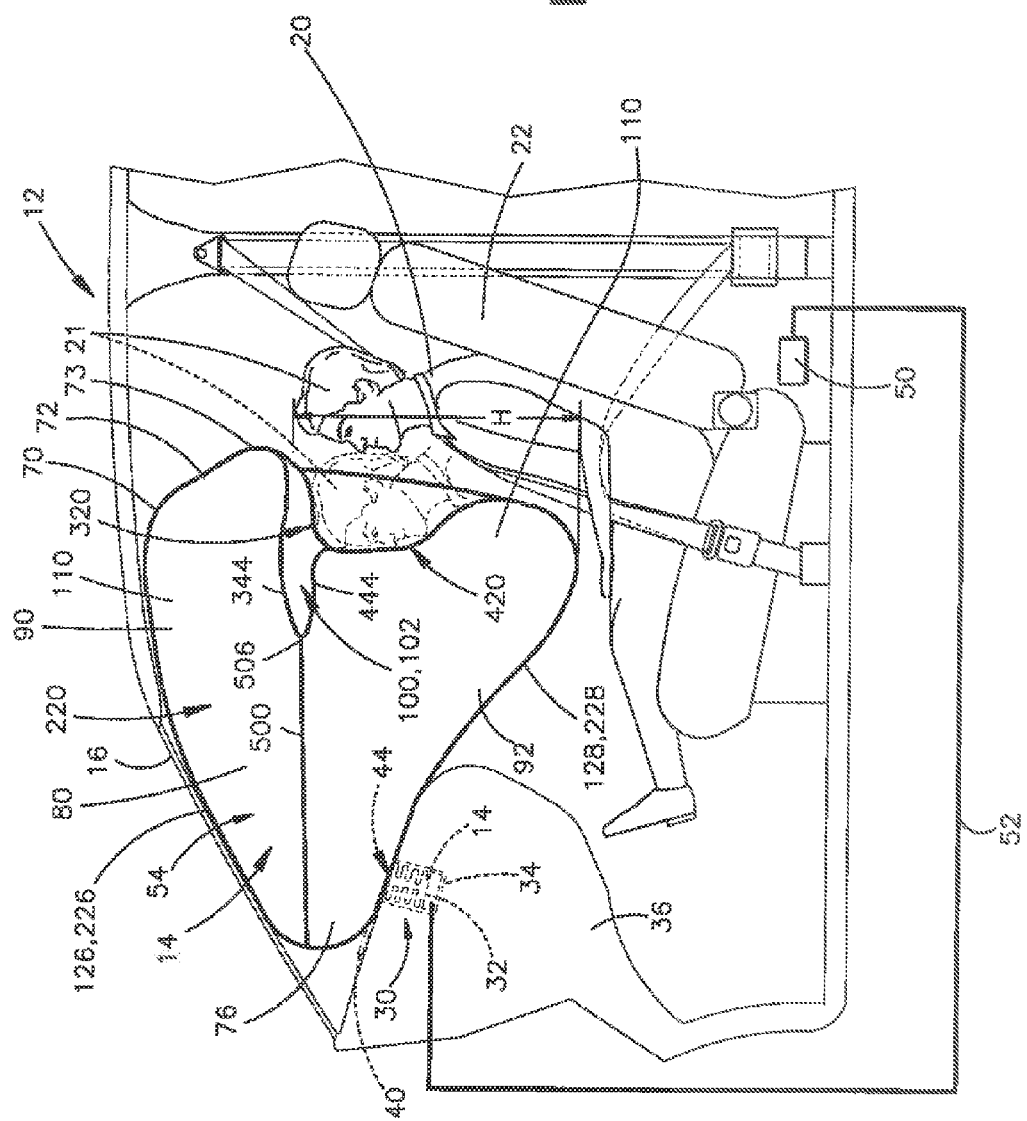

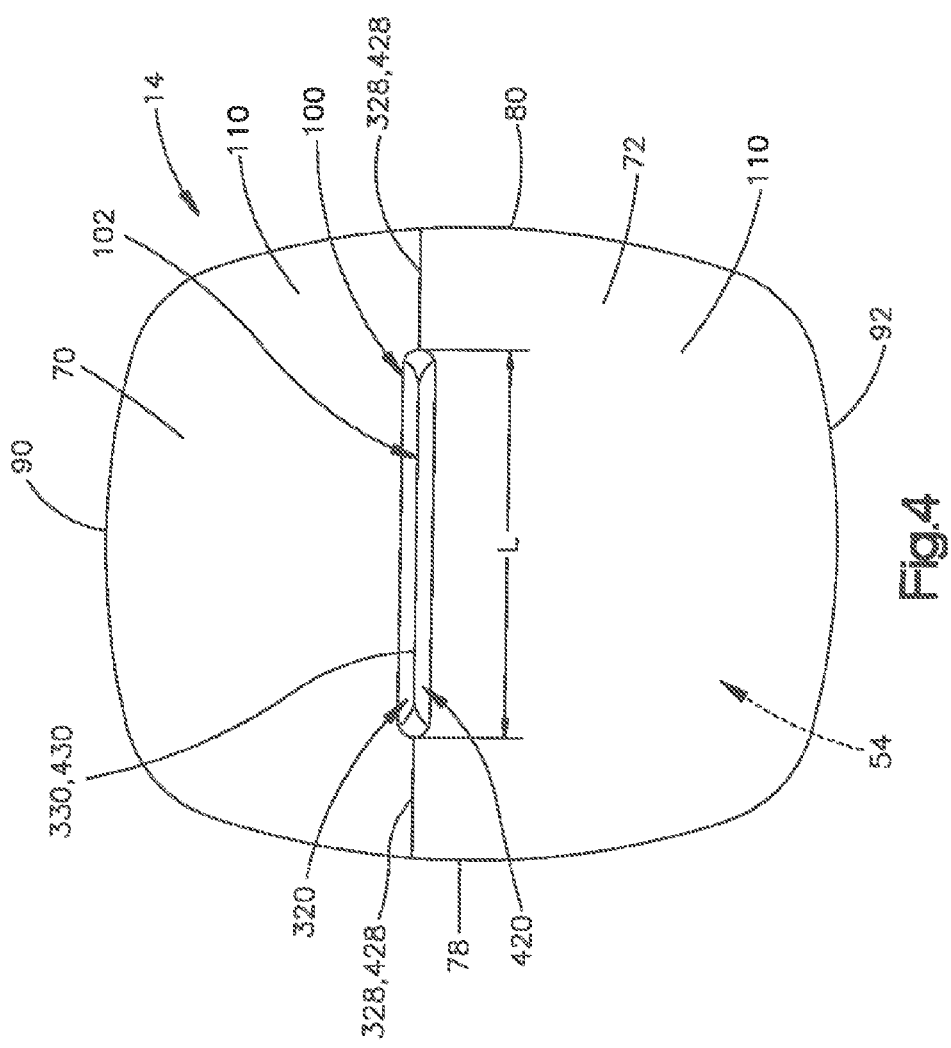

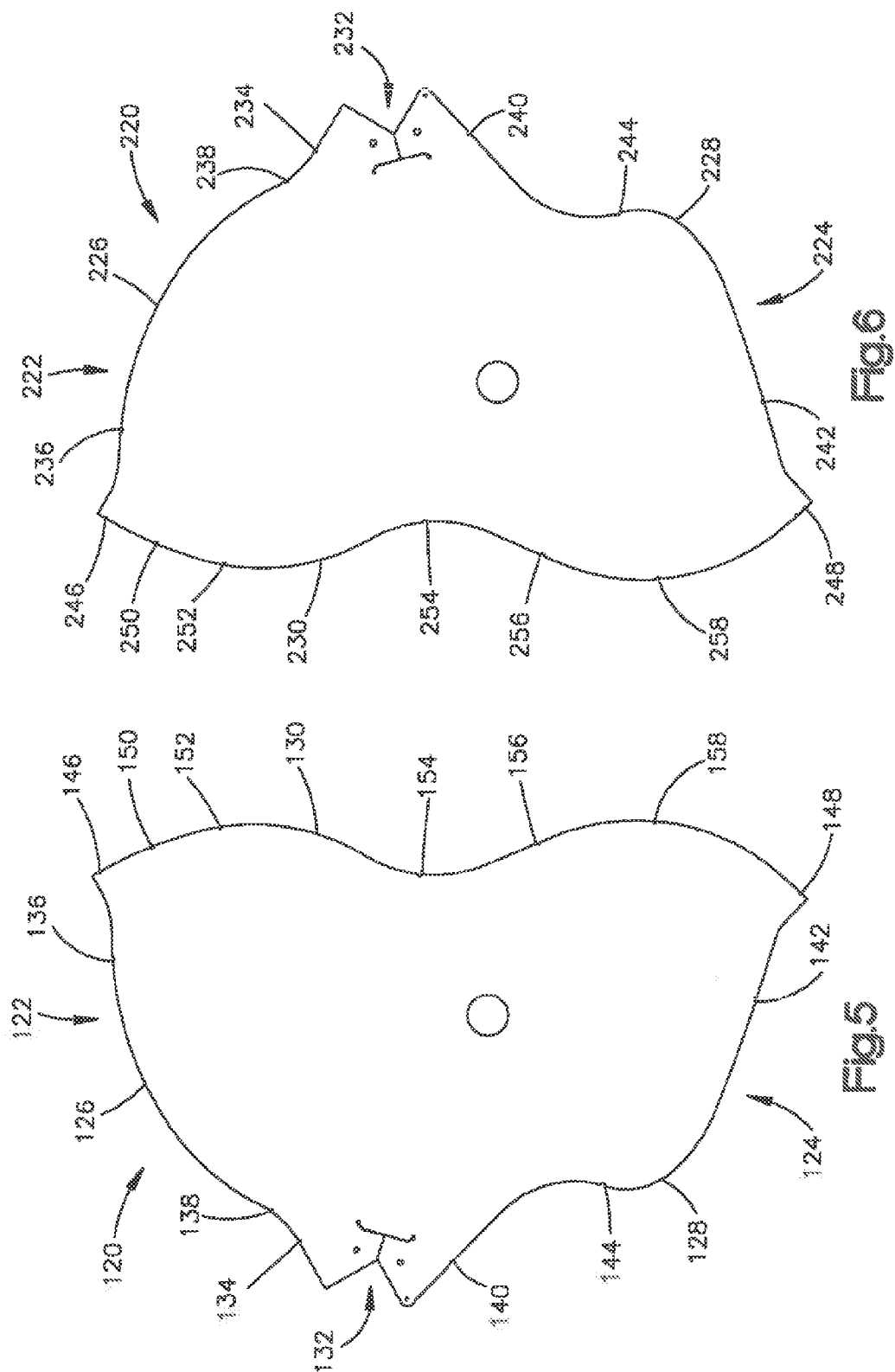

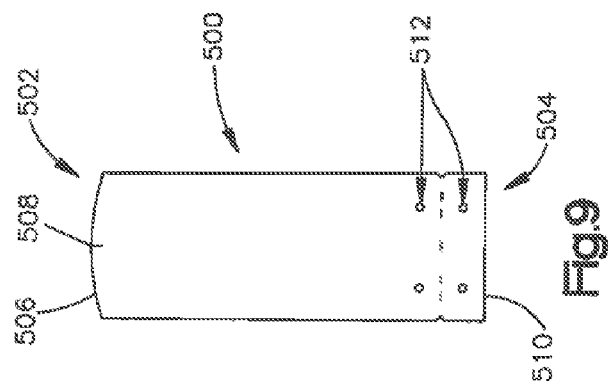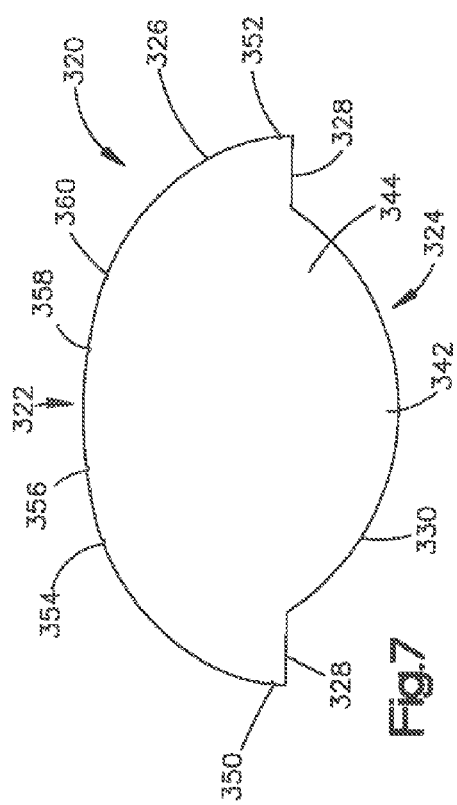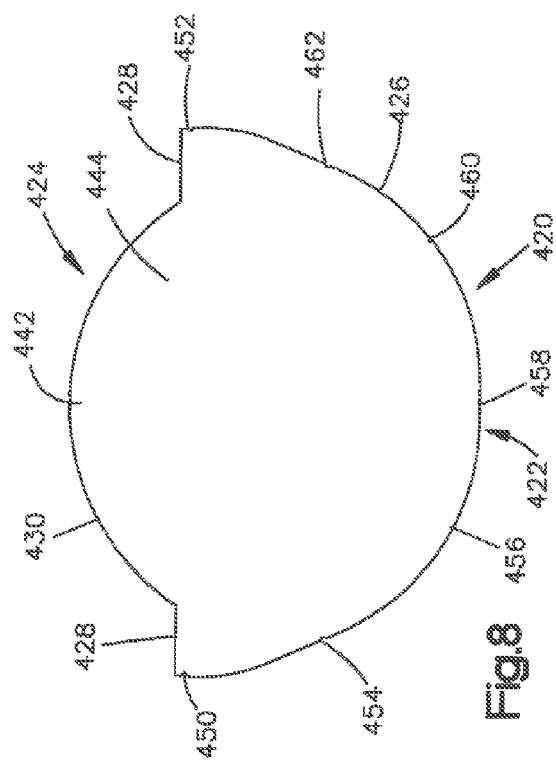

AIR BAG WITH UNINFLATED POCKET

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

The position of the occupant in the vehicle seat may dictate how the air bag is configured in order to more adequately protect the occupant during vehicle crashes. For instance, it may be desirable to protect the occupant from striking or being struck by the deploying air bag with high restraint forces. Such is the case when the occupant is unbelted and, thus, is positioned closer to the instrument panel during air bag deployment than a belted occupant. Rearward facing car seats that carry infants are also positioned on the vehicle seat in a position where an air bag is likely to deploy.

SUMMARY OF THE INVENTION

In accordance with an embodiment of the present invention, an inflatable vehicle occupant protection device is provided for being inflated with inflation fluid towards a seat of the vehicle. The protection device includes a front portion presented towards the vehicle seat and helping to define an inflatable volume. The front portion includes a pair of extensions overlaid on one another and interconnected to form a pocket defining a collapsed volume outside the inflatable volume. The pocket extends horizontally across the front portion and towards the inflatable volume. A tether has a first end portion secured to both interconnected extensions and a second end portion secured to a portion of the protection device such that the size of the pocket remains larger than a predetermined amount when the protection device is fully inflated.

In accordance with another embodiment of the present invention, an inflatable vehicle occupant protection device for being inflated with inflation fluid towards a seat of the vehicle includes a front portion presented towards the vehicle seat and having a pair of extensions overlaid on one another and interconnected to form a pocket. A rear portion is provided opposite the front portion and first and second lateral portions interconnect the front portion and the rear portion to define an inflatable volume. The pocket defines a collapsed volume outside the inflatable volume. The pocket extends horizontally across the front portion and towards the inflatable volume. A tether has a first end portion secured to both interconnected extensions and a second end portion secured to the rear portion of the protection device such that the size of the pocket remains larger than a predetermined amount when the protection device is fully inflated.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic side view illustrating an apparatus for helping to protect a first sized occupant of a vehicle having an uninflated pocket in accordance with an embodiment of the present invention;

FIG. 2 is a side sectional view of FIG. 1;

FIG. 3 is a front view of the air bag of FIG. 1;

FIG. 4 is a schematic side view illustrating the apparatus of FIG. 1 for helping to protect a second sized occupant of the vehicle;

FIG. 5 is a schematic illustration of a left panel for constructing the air bag of FIG. 1;

FIG. 6 is a schematic illustration of a right panel for constructing the air bag of FIG. 1;

FIG. 7 is a schematic illustration of a first front panel for constructing the air bag of FIG. 1;

FIG. 8 is a schematic illustration of a second front panel for constructing the air bag of FIG. 1; and FIG. 9 is a schematic illustration of a panel for a tether for the air bag of FIG. 1.

DETAILED DESCRIPTION OF THE INVENTION

An apparatus 10 for helping to protect an occupant 20 of a vehicle 12 includes an inflatable vehicle occupant protection device 14 in the form of an air bag. In the embodiment illustrated in FIG. 1, the air bag 14 is a passenger frontal air bag that minimizes interaction with the occupant 20 on a passenger side 24 of the vehicle 12 during inflation. Those skilled in the art will appreciate that the apparatus 10 disclosed herein could be adapted for occupants 20 on the driver side (not shown) of the vehicle 12 or occupants in rearward rows (not shown) of the vehicle, such as a $2^{nd}$ row, $3^{rd}$ row, etc., of the vehicle.

The air bag 14 may be part of an air bag module 30 that includes an inflator 32 and a housing 34. The air bag 14 has a stored condition, indicated by dashed lines in FIG. 1, in which the air bag is folded and placed in the housing 34. The module 30 is mounted to a dash or instrument panel 36 of the vehicle 12 adjacent a vehicle windshield 16. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as sewing, stitching, ultrasonic welding, heat bonding, or adhesives, to form the air bag. The air bag 14 may be uncoated, coated with a material, such as a gas impermeable urethane or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

In the embodiment of FIG. 1, the inflated air bag 14 deploys from the instrument panel 36 in an aft direction toward the vehicle seat 22. The air bag 14 includes a front portion 70 and a rear portion 76. In the deployed condition, the front portion 70 is spaced from the instrument panel 36 and includes a front panel 72 that is presented towards the vehicle seat 22. The rear portion 76 is positioned adjacent the windshield 16 and instrument panel 36 and occupies a substantial portion of the space between the windshield and the instrument panel. Lateral portions 78, 80 extend from the front portion 70 to the rear portion 76. The lateral portion 78 is positioned on the inboard side of the vehicle 12 and the lateral portion 80 is positioned on the outboard side of the vehicle. The lateral portions 78, 80 may extend substantially parallel to one another.

A top portion 90 is positioned adjacent the windshield 16 and extends from the rear portion 76 to the front portion 70. A bottom portion 92 is positioned adjacent the vehicle seat 22 and extends from the rear portion 76 to the front portion 70. Collectively, the front portion 70, rear portion 76, lateral portions 78, 80, top portion 90, and bottom portion 92 define an inflatable volume 54 of the air bag 14.

The air bag 14 includes a pocket 100 that extends inward to define a collapsed volume 102 positioned outside of the inflatable volume 54. The inward pocket 100 has a length L (see FIG. 4) extending in an inboard-outboard direction of the vehicle 12 from the lateral portion 78 to the lateral portion 80. In one example, the length L is less than the width of the air bag 14 in the inboard-outboard direction, i.e., the pocket 100 does not extends across the entire front panel 72 and is therefore spaced from both lateral portions 78, 80. The length L may, however, extend across the entire front panel 72 (not shown).

The inward pocket 100 has a depth extending in a fore-aft direction of the vehicle 12 from the front portion 70 of the air bag 14 towards the rear portion 76 and may terminate prior to the rear portion. As best shown in FIG. 3, the inward pocket 100 divides the front portion 70 of the air bag 14 into a pair of laterally extending inflatable lobes 110 positioned on opposite sides of the pocket. Alternatively, the inward pocket 100 may extend through the entire air bag 14 from the front portion 70 to the rear portion 76 (not shown).

A flexible elongated member, such as a tether 500, interconnects portions of the air bag 14 to help maintain the pocket 100 in the inward condition during inflation of the air bag 14. The tether 500 acts on the pocket 100 such that the size and/or fore-aft depth of the pocket remains substantially constant when the air bag 14 is fully inflated. Although a single tether 500 is illustrated in FIG. 1 for maintaining the pocket 100 in the inward condition when the air bag 14 if fully inflated, more or fewer tethers may be used to connect one or more portions of the pocket with one or more portions 70, 72, 76, 78, 80, 90, 92 of the air bag.

FIGS. 5-9 illustrate plan views of component parts used to construct the air bag 14 in accordance with an embodiment of the present invention. The component parts of the air bag 14 include a first panel 120, a second panel 220, a third panel 320, and a fourth panel 420 interconnected to define the inflatable volume 54 of the air bag. The panel of the tether 500 connects a module side of the air bag 14 (formed by the first and second panels 120, 220) to the pocket 100 (formed by the third and fourth panels 320, 420) to determine and maintain the fore-aft depth of the pocket when the air bag is fully inflated.

As shown in FIG. 5, the first panel 120 extends from a first end portion 122 to a second end portion 124 and may be formed from one piece of material. The first panel 120 forms the inboard side of the air bag 14 and is defined by contoured first, second, and third peripheral edges 126, 128, 130. The first panel 120 may include one or more openings 132 for accommodating a connection with the air bag module 30, e.g., the housing 34 and/or inflator 32.

The first, second, and third peripheral edges 126, 128, 130 each include a series of notches for helping to assemble the air bag 14. In particular, the first peripheral edge 126 includes a first notch 134 positioned adjacent the opening 132, a second notch 136 positioned adjacent the third peripheral edge 130, and a third notch 138 positioned between the first and second notches. Similarly, the second peripheral edge 128 includes a first notch 140 positioned adjacent the opening 132, a second notch 142 positioned adjacent the third peripheral edge 130, and a third notch 144 positioned between the first and second notches.

The third peripheral edge 130 includes a first notch 146 positioned adjacent the first peripheral edge 126, a second notch 148 positioned adjacent the second peripheral edge 128, and third through sixth notches 150, 152, 154, 156, 158 positioned between the first and second notches.

Referring still to FIG. 6, the second panel 220 is similarly shaped to the first panel 120. The second portion 76 extends from a first end portion 222 to a second end portion 224 and may be formed from one piece of material. The first panel 220 forms the outboard side of the air bag 24 and is defined by contoured first, second, and third peripheral edges 226, 228, 230. The first panel 220 may include one or more openings 232 for accommodating a connection with the air bag module 30, e.g., the housing 34 and/or inflator 32.

The first, second, and third peripheral edges 226, 228, 230 each include a series of notches for helping to assemble the air bag 14. In particular, the first peripheral edge 226 includes a first notch 234 positioned adjacent the opening 232, a second notch 236 positioned adjacent the third peripheral edge 230, and a third notch 238 positioned between the first and second notches. Similarly, the second peripheral edge 228 includes a first notch 240 positioned adjacent the opening 232, a second notch 242 positioned adjacent the third peripheral edge 230, and a third notch 244 positioned between the first and second notches.

The third peripheral edge 230 includes a first notch 246 positioned adjacent the first peripheral edge 226, a second notch 248 positioned adjacent the second peripheral edge 228, and third through seventh notches 250, 252, 254, 256, 258 positioned between the first and second notches.

Although the first and second panels 120, 220 are illustrated as being separate panels of material, those skilled in the art will appreciate that the first and second panels could likewise be formed together as a single panel of material. For example, portions of first panel 120 adjacent to the openings 132, e.g., portions of the first and second peripheral edges 126, 128, may be configured and shaped to be integrally formed with portions of the second panel 220 adjacent to the openings 232, e.g., portions of the first and second peripheral edges 226, 228, such that the first and second panels may be formed as a single piece of material (not shown).

As shown in FIG. 7, the third panel 320 has a generally rounded shape and helps form the upper portion of the front panel 72 of the air bag 14 closer to the windshield 16. The third panel 320 may be formed as one piece of material and extends from a first end portion 322 to a second end portion 324. The third panel 320 includes a first peripheral edge 326, a second peripheral edge 328, and a third peripheral edge 330. The second peripheral edge 328 connects the first peripheral edge 326 to the third peripheral edge 330. The first peripheral edge 326 has an arcuate or hemispherical contour. The second peripheral edge 328 is substantially straight.

The third peripheral edge 330 extends from the second peripheral edge 328 and away from the first peripheral edge 326 to form one or more extensions 344 of material. As shown in FIG. 7, a single extension 344 extends from the second peripheral edge 328. The extension 344 has an arcuate or semicircular contour, although the extension may have alternative shapes, such as square, triangular, rectangular or the like. An indicator or marker 342 is provided on the third peripheral edge 330 at the furthest point from the first peripheral edge 326.

The first peripheral edge 326 includes a series of notches for helping to assemble the air bag 14. In particular, the first peripheral edge 326 includes a first notch 350 positioned adjacent the second peripheral edge 328 on one side of the extension 344, a second notch 352 positioned adjacent the second peripheral edge on the other side of the extension, and third through sixth notches 354, 356, 358, 360 positioned between the first and second notches.

As shown in FIG. 8, the fourth panel 420 is similarly shaped to the third panel 320 but larger than the third panel 320. The fourth panel 420 has a generally rounded shape and helps to form the lower portion of the front panel 72 of the air bag 14 closer to the vehicle seat 22. The fourth panel 420 may be formed as one piece of material and extends from a first end portion 422 to a second end portion 424. The fourth panel 420 includes a first peripheral edge 426, a second peripheral edge 428, and a third peripheral edge 430. The second peripheral edge 428 connects the first peripheral edge 426 to the third peripheral edge 430. The first peripheral edge 426 has an arcuate or hemispherical contour with a greater radius of curvature than the first peripheral edge 326 of the third panel 320. The second peripheral edge 428 is straight and has the same length as the second peripheral edge 328 of the third panel 320.

The third peripheral edge 430 extends from the second peripheral edge 428 and away from the first peripheral edge 426 to form one or more extensions 444 of material. As shown in FIG. 8, a single extension 444 extends from the second peripheral edge 428. The extension 444 has an arcuate or semicircular contour, although the extension may have alternative shapes, such as square, triangular, rectangular or the like. In any case, the extension(s) 444 has the same size and shape as the extension(s) 344 of the third panel 320. An indicator or marker 442 is provided on the third peripheral edge 430 at the furthest point from the first peripheral edge 426.

The first peripheral edge 426 includes a series of notches for helping to assemble the air bag 14. In particular, the first peripheral edge 426 includes a first notch 450 positioned adjacent the second peripheral edge 428 on one side of the extension 444, a second notch 452 positioned adjacent the second peripheral edge 428 on the other side of the extension, and third through sixth notches 454, 456, 458, 460 positioned between the first and second notches.

Although the third and fourth panels 320, 420 are illustrated as separate components it will be appreciated that the third and fourth panels may alternatively be formed together as a single, unitary component. For example, portions of the third peripheral edge 330 on the third panel 320 may be configured and shaped to be integrally formed with portions of the third peripheral edge 430 of the fourth panel 420 such that the third and fourth panels may be formed as a single piece of material (not shown).

As shown in FIG. 9, the tether 500 may be formed as a one piece panel of material having a first end portion 502 and a second end portion 504. The first end portion 502 includes an edge 506 and the second end portion 504 includes an edge 510. The second end portion 504 further includes one or more openings 512 for receiving fasteners (not shown) to secure the second end portion to the air bag 14. Although the tether 500 is illustrated as having a substantially rectangular shape, alternative shapes such as square, rectangular, arcuate, etc. may also be used. In any case, the tether 500 does not divide the air bag 14 into separate, sequentially filled chambers. The tether 500 may be free of openings between the fastener openings 512 and the edge 506 or may include one or more openings (not shown) allowing inflation fluid to flow therethrough.

To assemble the air bag 14, the first peripheral edge 126 of the first panel 120 is secured to the first peripheral edge 226 of the second panel 220 along a seam (not shown). In particular, the first, second, and third notches 134, 136, 138 on the first peripheral edge 126 of the first panel 120 are aligned with the respective first, second, and third notches 234, 236, 238 of the first peripheral edge 226 of the second panel 220. The seam (not shown) then secures the entire first peripheral edge 126 of the first panel 120 to the entire first peripheral edge 226 of the second panel 220.

The second peripheral edge 128 of the first panel 120 is secured to the second peripheral edge 228 of the second panel 220 along a seam (not shown). In particular, the first, second, and third notches 140, 142, 144 on the second peripheral edge 128 of the first panel 120 are aligned with the respective first, second, and third notches 240, 242, 244 of the second peripheral edge 228 of the second panel 220. The seam (not shown) then secures the entire second peripheral edge 128 of the first panel 120 to the entire second peripheral edge 228 of the second panel 220.

The third and fourth panels 320, 420 are placed on top of one another such that the second peripheral edges 328, 428 overlie one another and the third peripheral edges 330, 430 overlie one another. In this configuration, the first peripheral edges 326, 426 do not overlie one another. A single seam is used to secure together the corresponding pairs of peripheral edges 328, 428, and 330, 430, respectively. Consequently, the interconnected extensions 344, 444 cooperate to form the pocket 100, with the seam interconnecting the peripheral edges 328, 428 extending on opposing sides of the pocket 100 (see FIG. 4). The first peripheral edges 326, 426 are then moved apart from one another by folding the interconnected extensions 344, 444 relative to the remainder of the panels 320, 420 such that the first peripheral edges are substantially coplanar and form a circular or rounded shape. In this configuration, the interconnected extensions 344, 444 reside underneath the remainder of the panels 320, 420 (as viewed in FIGS. 7 and 8).

The interconnected third and fourth panels 320, 420 are secured to the interconnected first and second panels 120, 220. The first peripheral edge 326 of the third panel 320 is secured by a seam to the third peripheral edge 130 of the first panel 120. In particular, the third notch 150, fourth notch 152, and fifth notch 154 on the third peripheral edge 130 of the first panel 120 are aligned with the fourth notch 356, third notch 354, and first notch 350, respectively, on the first peripheral edge 326 of the third panel 320. This places the first notch 146 on the third peripheral edge 130 of the first panel 120 adjacent a midpoint of the first peripheral 326 of the third panel 320.

The seam (not shown) then secures the portion of the third peripheral edge 130 of the first panel 120 starting from the fifth notch 154 and ending at the first peripheral edge 126 to the portion of the first peripheral edge 326 of the third panel 320 starting from the second peripheral edge 328, traveling clockwise along the first peripheral edge 326 (as viewed in FIG. 6), and ending at the midpoint of the first peripheral edge 326.

The first peripheral edge 326 of the third panel 320 is also secured by a seam to the third peripheral edge 230 of the second panel 220. In particular, the third notch 250, fourth notch 252, and fifth notch 254 on the third peripheral edge 230 of the second panel 220 are aligned with the fifth notch 358, sixth notch 360, and second notch 352, respectively, on the first peripheral edge 326 of the third panel 320. This places the first notch 246 on the third peripheral edge 230 of the second panel 220 adjacent the midpoint of the first peripheral 326 of the third panel 320.

The seam (not shown) then secures the portion of the third peripheral edge 230 of the second panel 220 starting from the fifth notch 254 and ending at the first peripheral edge 226 to the portion of the first peripheral edge 326 of the third panel 320 starting from the second peripheral edge 328, traveling counterclockwise along the first peripheral edge 326 (as viewed in FIG. 7), and ending at the midpoint of the first peripheral edge 326.

The first peripheral edge 426 of the fourth panel 420 is secured by a seam to the third peripheral edge 130 of the first panel 120. In particular, the second notch 148, seventh notch 158, sixth notch 156, and fifth notch 154 on the third peripheral edge 130 of the first panel 120 are aligned with the fifth notch 458, fourth notch 456, third notch 454, and first notch 450, respectively, on the first peripheral edge 426 of the fourth panel 420.

The seam (not shown) then secures the portion of the third peripheral edge 130 of the first panel 120 starting from the fifth notch 154 and ending at the second peripheral edge 128 to the portion of the first peripheral edge 426 of the fourth panel 420 starting from the second peripheral edge 428, traveling counterclockwise along the first peripheral edge 426 (as viewed in FIG. 8), and ending at the fifth notch 458.

The first peripheral edge 428 of the fourth panel 420 is also secured by a seam to the third peripheral edge 230 of the second panel 220. In particular, the second notch 248, seventh notch 258, sixth notch 256, and fifth notch 254 on the third peripheral edge 230 of the second panel 220 are aligned with the fifth notch 458, sixth notch 460, seventh notch 462, and second notch 452, respectively, on the first peripheral edge 426 of the fourth panel 420.

The seam (not shown) then secures the portion of the third peripheral edge 230 of the second panel 220 starting from the fifth notch 254 and ending at the second peripheral edge 228 to the portion of the first peripheral edge 426 of the fourth panel 420 starting from the second peripheral edge 428, traveling counterclockwise along the first peripheral edge 426 (as viewed in FIG. 7), and ending at the fifth notch 458.

The interconnected third peripheral edges 330, 430 of the extensions 344, 444 are secured to the edge 506 of the first end portion 502 of the tether 500 along a seam (not shown). To this end, the indicator 508 on the tether 500 is aligned with the interconnected indicators 342, 344 on the extensions 344, 444 and the tether secured directly to both extensions. The second end portion 504 of the tether 500 is secured to a portion of the air bag 14, e.g., secured to the rear portion 76 of the air bag.

Securing the first, second, third, and fourth panels 120, 220, 320, 420 together forms and defines the front portion 70, the rear portion 76, the lateral portions 78, 80, the top portion 90, and the bottom portion 92 of the air bag 14. The first, second, third, and fourth panels 120, 220, 320, 420, when secured together, also cooperate to define the inflatable volume 54 of the air bag 14.

The tether 500 is sized and configured such that the inflatable volume 54 is formed as a single chamber. To this end, the tether 500 has a narrow width such that fluid exchange between the portion of the air bag 14 above the tether and the portion of the bag below the tether is not impeded and inflation fluid is free to flow simultaneously into all portions 70, 76, 78, 80, 90, 92 of the air bag. In other words, the tether 500 does not divide the air bag 14 into separate chambers that are sequentially filled upon deployment or have inflation fluid openings or means by which inflation fluid may flow from one portion of the air bag to another portion. As a result, the air bag 14 of the present invention inflates substantially evenly and simultaneously in all directions.

In an embodiment (not shown) with a pocket 100 traversing the full inboard-outboard width of the air bag 14 and utilizing a wide tether 500 to control the depth of the pocket there would be more separation between the portions of the air bag above and below the tether, and an opening(s) provided in the tether to ensure more simultaneous filling of the air bag above and below the tether.

The first, second, third, and fourth panels 120, 220, 320, 420 are secured to one another such that the pocket 100 and the tether 500 extend inward toward the inflatable volume 54 of the air bag 14 prior to inflation of the air bag. When the air bag 14 is fully inflated, the pocket 100 extends away from the front panel 72 of the air bag towards the rear portion 76 to define the collapsed volume 102. In other words, the pocket 100 extends inward relative to the front panel 72 towards the rear portion 76 of the air bag 14 when the air bag 14 is fully inflated.

It will be understood that the interconnected extensions 344, 444 may initially extend in the aft direction away from the front panel 72 prior to inflation, i.e., the pocket 100 may initially be inverted outward. In this configuration, full deployment of the air bag 14 causes the tether 500 to pull the pocket 100 in the fore direction until the entire pocket extends towards the rear portion 76 of the air bag and the desired pocket depth is achieved/maintained. In any case, the tether 500 acts on the pocket 100, i.e., the interconnected extensions 344, 444, such that the size and/or depth of the pocket 100 remains substantially constant when the air bag 14 is fully inflated.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated, deployed, and pressurized condition illustrated in solid lines in FIG. 1. The air bag 14, when inflated, helps protect the vehicle occupant 20 from impacts with parts of the vehicle 12, such as the instrument panel 36.

In the fully inflated condition shown in FIG. 1, the front portion 70 of the air bag 14 is positioned away from the instrument panel 36 and the front panel 72 is presented facing the vehicle seat 22. The top portion 90 extends along the windshield 16 and occupies the space between the windshield and the instrument panel 36. The bottom portion 92 extends along the instrument panel 36 and projects from the instrument panel toward the vehicle seat 22.

The pocket 100 extends from the front portion 72 of the air bag 14 towards the rear portion 76. The position of the pocket 100 when the air bag 14 is inflated is configured to correspond with the likely or expected position of the head 21 of a normally sized (50% percentile) occupant 20 when normally positioned on the seat 22. More specifically, the pocket 100 is configured to deploy at a height H (see FIG. 1) that is aligned with the head 21 of an occupant 20 having average or above-average height.

As the air bag 14 deploys toward the occupant 20, the first end portion 502 of the tether 500, being secured to the first peripheral edges 330, 430 of the pocket 100, move away from the instrument panel 36 and toward the occupant 20. Since the second end portion 504 of the tether 500 is secured to the rear portion 76 adjacent to the instrument panel 38 the tether provides resistance to movement of the pocket 100 out of the inward condition shown in FIGS. 1-2 and thereby helps maintain the size, position, and orientation of the pocket. In one example, the tether 500 acts on the pocket 100 such that the extensions 344, 444 substantially engage one another when the air bag 14 fully deploys.

As shown in FIG. 3, when the air bag 14 deploys, the pocket 100 is configured to extend in a substantially horizontal direction along the front portion 70 of the air bag between the lateral portions 78, 80. Those skilled in the art will appreciate that the pocket 100 may alternatively be configured to extend at an angle relative to the front portion 70 and/or extend from the lateral portion 70 to the lateral portion 80 of the air bag (not shown) in accordance with the present invention.

The pocket 100 is sized, shaped, and positioned to tailor the degree of restraint forces upon the occupant 20 based on the size of the occupant, more specifically, based on the occupant's height. To this end, the height H of the pocket 100 along the front portion 70 of the air bag 14 helps to ensure a taller sized occupant 20 experiences a greater restraint than a shorter occupant.

An air bag creates two types of forces to restrain an occupant. The first is pressure in the air bag that acts on surface area on the occupant (Force=Pressure×Area). The second is generated by the tension in the air bag fabric, which is proportional to the pressure and the surface area of the air bag. By horizontally dividing the front panel 72 of the air bag 14, the pocket 100 of the present invention provides a break or split in the fabric tension along the front portion 70. Consequently, although the air bag 14 includes a single inflatable volume 54 each lobe 110 of the air bag provides a separate and independent resistance to occupant 20 penetration.

Referring to FIG. 2, when the normally seated belted or unbelted occupant 20 moves toward the inflated air bag 14, the occupant's head 21 enters above the pocket 100. The head 21 of a taller occupant 20 is positioned above the pocket 100 and therefore engages and interacts with both lobes 110 of the air bag 14. As a result, the entire inflatable volume 54 of the air bag 14 provides resistance to penetration by the occupant and, thus, the taller, penetrating occupant 20 experiences relative large restraint forces at the front panel 72.

Referring to FIG. 3, when the shorter, normally seated belted or unbelted occupant 20 moves toward the inflated air bag 14, the occupant's head 21 is positioned at or below the pocket 100. The shorter occupant 20 therefore engages and interacts with only the lower lobe 110 of the air bag 14, which deflects relative to the substantially stationary upper lobe 110. More specifically, although the tether 500 is taught the pocket 100 allows the shorter occupant 20 to engage and interact with the lower lobe 110 without affecting the upper lobe 110. When this occurs, the extension 444 is compressed or shortened under the impact of the penetrating shorter occupant 20. Since the air bag 14 is still pressurized, the inflation fluid in the lower lobe 110 is displaced into the upper lobe 110, causing the extension 344 to move aft in the vehicle 12 towards the occupant and forming an outward bulge 73 in the front panel 72. As a result, only the portion of the inflatable volume 54 below the tension break of the pocket 100 provides resistance to penetration by the occupant 20 and, thus, the shorter penetrating occupant 20 experiences reduced restraint forces at the front panel 72 compared to the taller occupant.

Although the air bag 14 of the present invention has been described as having a particular construction, those skilled in the art will appreciate that modifications to the air bag can be made without deviating from the spirit of the invention. The size, shape, number, and configuration of the extensions 344, 444 may be configured to form a pocket 100 and, thus, a particular collapsed volume 102 that has a particular configuration, e.g., size, shape, and orientation, in order to meet desired performance criteria. For example, one or more tethers 500 may be configured to be secured to any one or more portions 70, 72, 76, 78 ,80, 90, 92 of the air bag 14. In particular, tethers 500 may be secured to each lateral portion 78, 80 of the air bag 14. Regardless of whether the air bag 14 includes the tether(s) 500, the extensions 344, 444 may be configured to exhibit a shape other than arcuate such as square, triangular, rectangular or the like.

From the above description of the invention, those skilled in the art will perceive improvements, changes and modifications. Such improvements, changes and modifications within the skill of the art are intended to be covered by the appended claims.

Having described the invention, the following is claimed:

1. An inflatable vehicle occupant protection device for being inflated with inflation fluid towards a seat of the vehicle, the protection device comprising:
   a front portion presented towards the vehicle seat and helping to define an inflatable volume, the front portion including a pair of extensions that are overlaid on one another and interconnected to form a pocket defining a collapsed volume outside the inflatable volume, the pocket extending horizontally across the front portion and towards the inflatable volume; and
   a tether having a first end portion secured to both interconnected extensions and a second end portion secured to a portion of the protection device such that the size of the pocket remains larger than a predetermined amount when the protection device is fully inflated.

2. The inflatable vehicle occupant protection device recited in claim 1, wherein the pocket divides the front portion into an upper lobe and a lower lobe.

3. The inflatable vehicle occupant protection device recited in claim 2, wherein the lower lobe provides a first resistance to occupant penetration and the upper lobe provides a second, lower resistance to occupant penetration.

4. The inflatable vehicle occupant protection device recited in claim 2, wherein the lower lobe provides a first resistance to occupant penetration and the lower lobe and the upper lobe cooperate to provide a second, higher resistance to occupant penetration.

5. The inflatable vehicle occupant protection device recited in claim 2, wherein the lower lobe is movable relative to the upper lobe.

6. The inflatable vehicle occupant protection device recited in claim 1, wherein the pocket is positioned closer to a top portion than a bottom portion of the protection device.

7. The inflatable vehicle occupant protection device recited in claim 1, wherein the pocket extends horizontally across only a part of the front portion.

8. The inflatable vehicle occupant protection device recited in claim 1, wherein the front portion is formed by first and second panels that each includes one of the extensions of material forming the pocket.

9. The inflatable vehicle occupant protection device recited in claim 8, wherein the interconnected extensions are identical and have an inward condition forming the pocket.

10. The inflatable vehicle occupant protection device recited in claim 8, wherein the first panel includes a first peripheral edge and a second peripheral edge extending from the first peripheral edge to define the extension of the first panel, the second panel including a first peripheral edge and a second peripheral edge extending from the first peripheral edge to define the extension of the second panel, the first peripheral edges being interconnected along a seam and the second peripheral edges being interconnected along a seam to form the pocket.

11. The inflatable vehicle occupant protection device recited in claim 10, wherein the first peripheral edges of the first and second panels are positioned in the front portion of the protection device.

12. The inflatable vehicle occupant protection device recited in claim 10, wherein the first peripheral edges are straight.

13. The inflatable vehicle occupant protection device recited in claim 10, wherein the first peripheral edges are interconnected along a pair of seams positioned along the front portion on opposite sides of the pocket.

14. The inflatable vehicle occupant protection device recited in claim 1, wherein the extensions are arcuate.

15. The inflatable vehicle occupant protection device recited in claim 1, wherein the extensions are hemispherical.

16. The inflatable vehicle occupant protection device recited in claim 1, wherein when the protection device is inflated an upper portion of the protection device above the pocket has a first material tension that provides a first resistance to occupant penetration, a lower portion of the protection device below the pocket having a second material tension that provides a second resistance to occupant penetration, the upper and lower portions having a combined material tension greater than the first material tension and the second material tension.

17. The inflatable vehicle occupant protection device recited in claim 1 further comprising a rear portion and first and second lateral portions connecting the front portion to the rear portion, wherein inflation fluid flows substantially simultaneously into the first and second lateral portions, the front portion, and the rear portion.

18. The inflatable vehicle occupant protection device recited in claim 1, wherein the tether is free of openings through which inflation fluid flows.

19. An inflatable vehicle occupant protection device for being inflated with inflation fluid towards a seat of the vehicle, the protection device comprising:
a front portion presented towards the vehicle seat and including a pair of extensions that are overlaid on one another and interconnected to form a pocket;
a rear portion opposite the front portion;
first and second lateral portions interconnecting the front portion and the rear portion to define an inflatable volume, wherein the pocket defines a collapsed volume outside the inflatable volume, the pocket extending horizontally across the front portion and towards the inflatable volume; and
a tether having a first end portion secured to both interconnected extensions and a second end portion secured to the rear portion of the protection device such that the size of the pocket remains larger than a predetermined amount when the protection device is fully inflated.

20. The inflatable vehicle occupant protection device recited in claim 19, wherein the pocket divides the front portion into an upper lobe and a lower lobe.

21. The inflatable vehicle occupant protection device recited in claim 20, wherein the lower lobe provides a first resistance to occupant penetration and the upper lobe provides a second, lower resistance to occupant penetration.

22. The inflatable vehicle occupant protection device recited in claim 20, wherein the lower lobe provides a first resistance to occupant penetration and the lower lobe and the upper lobe cooperate to provide a second, higher resistance to occupant penetration.

23. The inflatable vehicle occupant protection device recited in claim 20, wherein the lower lobe is movable relative to the upper lobe.

24. The inflatable vehicle occupant protection device recited in claim 19, wherein the pocket is positioned closer to a top portion than a bottom portion of the protection device.

25. The inflatable vehicle occupant protection device recited in claim 19, wherein the pocket extends horizontally across only a part of the front portion and is spaced from the first and second lateral portions.

26. The inflatable vehicle occupant protection device recited in claim 19, wherein the interconnected extensions are identical and have an inward condition forming the pocket.

27. The inflatable vehicle occupant protection device recited in claim 19, wherein the first panel includes a first peripheral edge and a second peripheral edge extending from the first peripheral edge to define the extension of the first panel, the second panel including a first peripheral edge and a second peripheral edge extending from the first peripheral edge to define the extension of the second panel, the first peripheral edges being interconnected along a seam and the second peripheral edges being interconnected along a seam to form the pocket.

28. The inflatable vehicle occupant protection device recited in claim 27, wherein the first peripheral edges of the first and second panels are positioned in the front portion of the protection device.

29. The inflatable vehicle occupant protection device recited in claim 27, wherein the first peripheral edges are straight.

30. The inflatable vehicle occupant protection device recited in claim 27, wherein the first peripheral edges are interconnected along a pair of seams positioned along the front portion on opposite sides of the pocket.

31. The inflatable vehicle occupant protection device recited in claim 19, wherein the extensions are arcuate.

32. The inflatable vehicle occupant protection device recited in claim 19, wherein the extensions are hemispherical.

33. The inflatable vehicle occupant protection device recited in claim 19, wherein when the protection device is inflated an upper portion of the protection device above the pocket has a first material tension that provides a first resistance to occupant penetration, a lower portion of the protection device below the pocket having a second material tension that provides a second resistance to occupant penetration, the upper and lower portions having a combined material tension greater than the first material tension and the second material tension.

34. The inflatable vehicle occupant protection device recited in claim 19, wherein the tether is free of openings through which inflation fluid flows.

\* \* \* \* \*